United States Patent
Choe et al.

(10) Patent No.: US 11,438,797 B2
(45) Date of Patent: Sep. 6, 2022

(54) METHOD AND APPARATUS FOR DISCARDING DATA AMONG ASSOCIATED TRANSMISSION BUFFERS IN WIRELESS COMMUNICATION SYSTEM

(71) Applicant: LG Electronics Inc., Seoul (KR)

(72) Inventors: Hyunjung Choe, Seoul (KR); Gyeongcheol Lee, Seoul (KR); Sunyoung Lee, Seoul (KR); Seungjune Yi, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/981,215

(22) PCT Filed: May 16, 2019

(86) PCT No.: PCT/KR2019/005876
§ 371 (c)(1),
(2) Date: Sep. 15, 2020

(87) PCT Pub. No.: WO2019/221530
PCT Pub. Date: Nov. 21, 2019

(65) Prior Publication Data
US 2021/0058824 A1    Feb. 25, 2021

Related U.S. Application Data

(60) Provisional application No. 62/673,120, filed on May 17, 2018.

(51) Int. Cl.
*H04W 28/06* (2009.01)
*H04W 76/27* (2018.01)
(Continued)

(52) U.S. Cl.
CPC .......... *H04W 28/06* (2013.01); *H04W 72/10* (2013.01); *H04W 72/1242* (2013.01);
(Continued)

(58) Field of Classification Search
CPC ..... H04W 28/06; H04W 28/14; H04W 72/10; H04W 72/12; H04W 72/1242;
(Continued)

(56) References Cited

U.S. PATENT DOCUMENTS 9,713,044 B2    7/2017  Yamada
2010/0035581 A1*  2/2010  Park ................... H04L 61/6022
                                                     714/E11.131
(Continued)

FOREIGN PATENT DOCUMENTS

EP          3261404      12/2017
WO      WO2017188758    11/2017
WO    WO-2019141061 A1 *  7/2019  ........... H04L 1/0004

OTHER PUBLICATIONS

3rd Generation Partnership Project; Technical Specification Group Radio Access Network, "Evolved Universal Terrestrial Radio Access (E-UTRA); Medium Access Control (MAC) protocol specification (Release 16)," 3GPP TS 36.321 V16.0.0, Mar. 2020, 141 pages.
(Continued)

*Primary Examiner* — Wutchung Chu
(74) *Attorney, Agent, or Firm* — Fish & Richardson P.C.

(57) ABSTRACT

A method and apparatus for discarding data among associated transmission buffers in a wireless communication system is provided. A wireless device generates a first data packet and a second data packet, and performs a random access (RA) procedure based on the first data packet. When the RA procedure based on the first data packet fails, the wireless device discards the first data packet, and continues the RA procedure based on the second data packet. A media
(Continued)

access control (MAC) layer indicates a radio resource control (RRC) layer that the RA procedure based on the second data packet is performed.

8 Claims, 17 Drawing Sheets

(51) Int. Cl.
  *H04W 72/10* (2009.01)
  *H04W 72/12* (2009.01)
  *H04W 74/08* (2009.01)
  *H04W 80/02* (2009.01)
(52) U.S. Cl.
  CPC ....... *H04W 74/0833* (2013.01); *H04W 76/27* (2018.02); *H04W 80/02* (2013.01)
(58) Field of Classification Search
  CPC . H04W 74/00; H04W 74/08; H04W 74/0833; H04W 76/27; H04W 80/02; H04W 68/00; H04W 4/70; H04W 72/14; H04W 56/005; H04W 74/006; H04W 48/02; H04W 72/02; H04W 72/042; H04W 48/10; H04W 68/02; H04W 72/1289; H04W 72/0413; H04W 28/18; H04W 74/02; H04W 48/20; H04W 52/0229; H04W 56/0045; H04W 72/1268; H04W 24/10; H04W 74/0808; H04W 72/04; H04W 74/004; H04W 74/008; H04W 52/0216; H04W 52/146; H04L 1/1854; H04L 5/0053; H04L 1/1812; H04L 1/1887; H04B 7/0695
  See application file for complete search history.

(56) References Cited

U.S. PATENT DOCUMENTS

| | | | |
|---|---|---|---|
| 2016/0142934 A1* | 5/2016 | Ahmadzadeh | H04W 28/06 370/328 |
| 2017/0135135 A1 | 5/2017 | Pelletier et al. | |
| 2018/0324854 A1* | 11/2018 | Phuyal | H04W 74/085 |
| 2019/0045554 A1* | 2/2019 | Ye | H04L 5/0007 |
| 2019/0098544 A1* | 3/2019 | Han | H04W 36/08 |
| 2020/0037345 A1* | 1/2020 | Ryoo | H04W 76/27 |
| 2020/0059390 A1* | 2/2020 | Zhang | H04W 72/14 |
| 2020/0187245 A1* | 6/2020 | Fujishiro | H04W 4/70 |
| 2020/0329505 A1* | 10/2020 | Shan | H04W 72/0486 |
| 2020/0374934 A1* | 11/2020 | Koskinen | H04W 76/27 |
| 2020/0374966 A1* | 11/2020 | Chang | H04W 74/0833 |
| 2020/0383134 A1* | 12/2020 | Tirronen | H04W 74/08 |
| 2021/0037553 A1* | 2/2021 | Wong | H04W 72/1268 |
| 2021/0076306 A1* | 3/2021 | Tamura | H04W 48/02 |
| 2021/0120420 A1* | 4/2021 | Pham Van | H04W 76/30 |
| 2021/0235265 A1* | 7/2021 | Stattin | H04W 76/18 |

OTHER PUBLICATIONS

Huawei, HiSilicon, "Introduction of EDT for eMTC and NB-IoT enhancements in TS 36.300," R2-1806519, 3GPP TSG-RAN2 Meeting #101bis, Sanya, P.R. China, Apr. 16-20, 2018, 12 pages.

* cited by examiner

METHOD AND APPARATUS FOR DISCARDING DATA AMONG ASSOCIATED TRANSMISSION BUFFERS IN WIRELESS COMMUNICATION SYSTEM

CROSS-REFERENCE TO RELATED APPLICATIONS

This application is a National Stage application under 35 U.S.C. § 371 of International Application No PCT/KR2019/005876, filed on May 16, 2019, which claims the benefit of U.S. Provisional Application No. 62/673,120, filed on May 17, 2018. The disclosures of the prior applications are incorporated by reference in their entirety.

TECHNICAL FIELD

The present invention relates to wireless communications, and more particularly, to a method and apparatus for discarding data among associated transmission buffers in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In Rel-13, narrowband internet-of-things (NB-IoT) and LTE for machine-type communication (LTE-M) were standardized to provide wide-area connectivity for IoT. The technologies in R31-14 evolved beyond the basic functionality specified in Rel-13. In Rel-15, to optimize the support for infrequent small data packet transmissions, a mechanism for data transmission during the random access procedure is specified for NB-IoT and LTE-M. This mechanism may be referred to as early data transmission (EDT) and can improve the device battery life and reduces the message latency.

SUMMARY

EDT can be performed only if specific conditions are satisfied. If the specific conditions are not satisfied, the UE should perform the legacy procedure for fallback of the EDT. For efficient fallback to the legacy procedure, it has been discussed to generate two versions of radio resource control (RRC) messages, one is for the EDT and the other is for the legacy procedure. However, this may require modification of the legacy message transmission mechanism.

In an aspect, a method performed by a wireless device in a wireless communication system is provided. The method includes generating a first data packet and a second data packet, performing a random access (RA) procedure based on the first data packet, determining that the RA procedure based on the first data packet fails, discarding the first data packet, continuing the RA procedure based on the second data packet, and indicating a radio resource control (RRC) layer that the RA procedure based on the second data packet is performed.

In another aspect, a wireless device in a wireless communication system is provided. The wireless device includes a memory, a transceiver, and a processor, operably coupled to the memory and the transceiver. The processor is configured to generate a first data packet and a second data packet, perform a random access (RA) procedure based on the first data packet, determine that the RA procedure based on the first data packet fails, discard the first data packet, continue the RA procedure based on the second data packet, and indicate a radio resource control (RRC) layer that the RA procedure based on the second data packet is performed.

In another aspect, a processor for a wireless device in a wireless communication system is provided. The processor is configured to generate a first data packet and a second data packet, perform a random access (RA) procedure based on the first data packet, determine that the RA procedure based on the first data packet fails, discard the first data packet, continue the RA procedure based on the second data packet, and indicate a radio resource control (RRC) layer that the RA procedure based on the second data packet is performed.

The legacy procedure can be performed efficiently while continuing on-going random access procedure, when the EDT fails.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
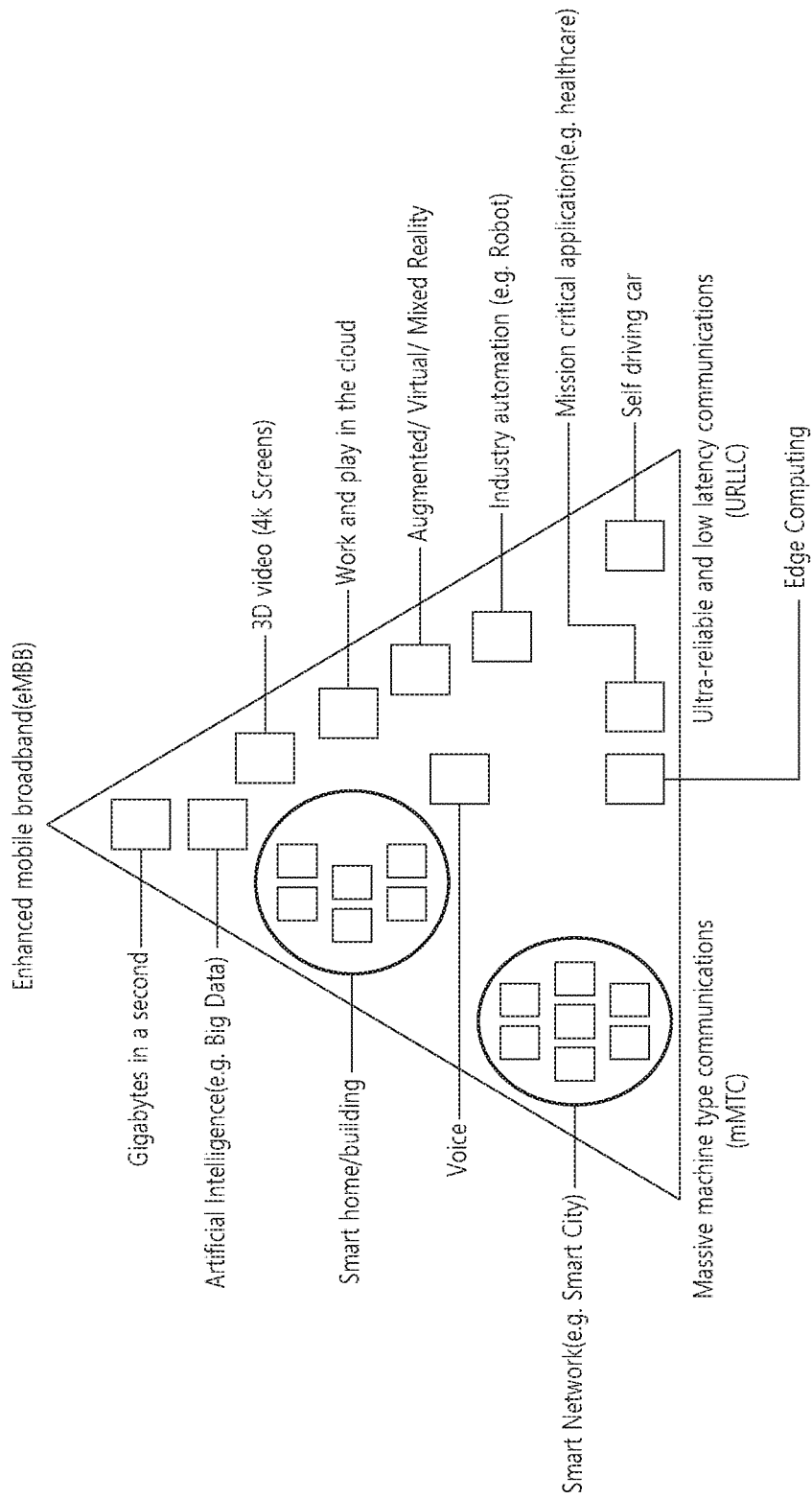
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
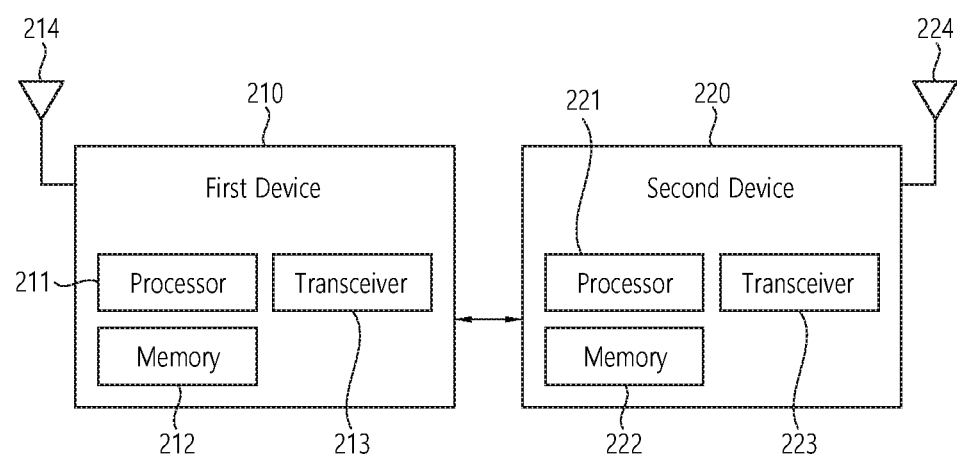
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
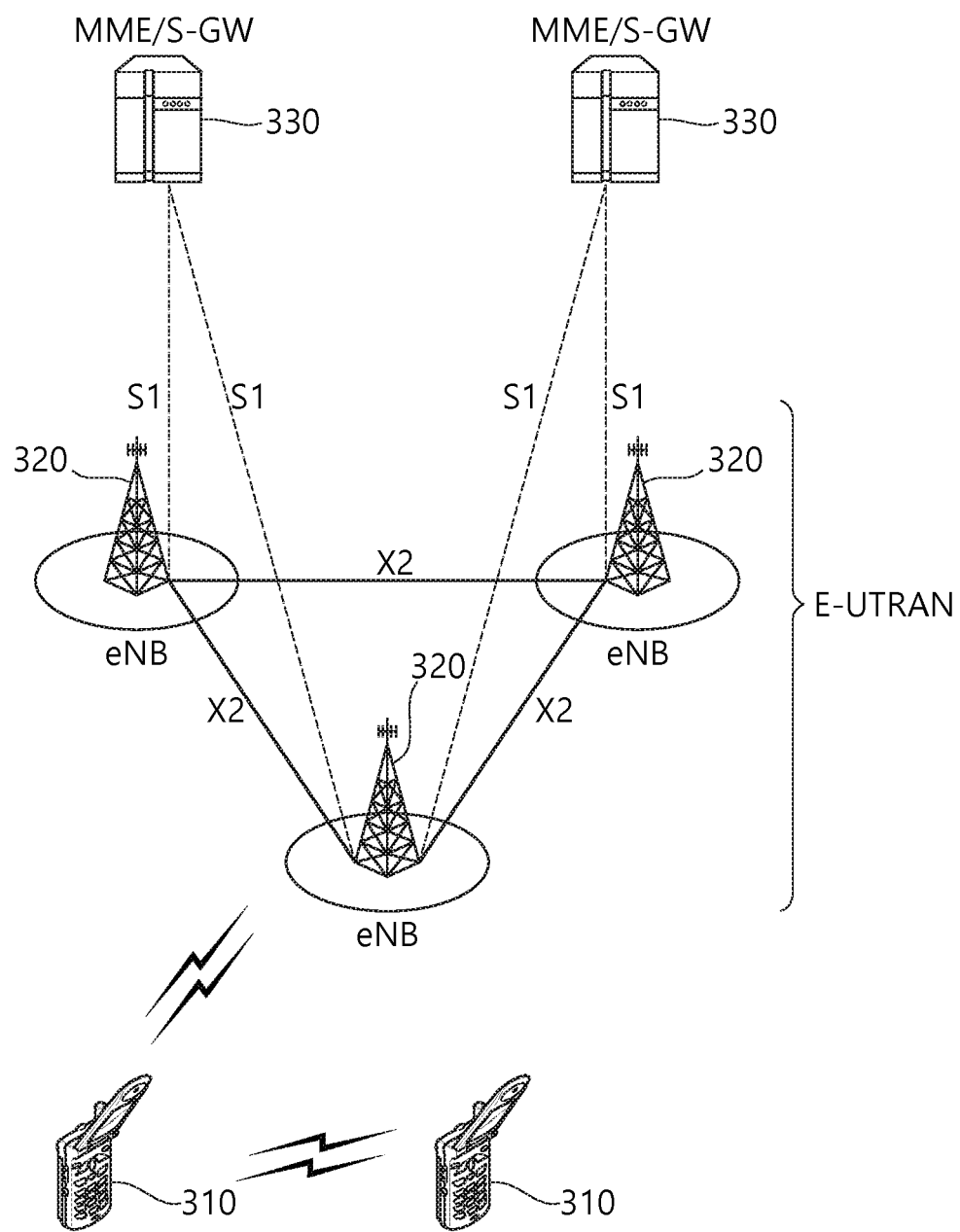
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMES/S-GWs and eNBs.

Figure 4:
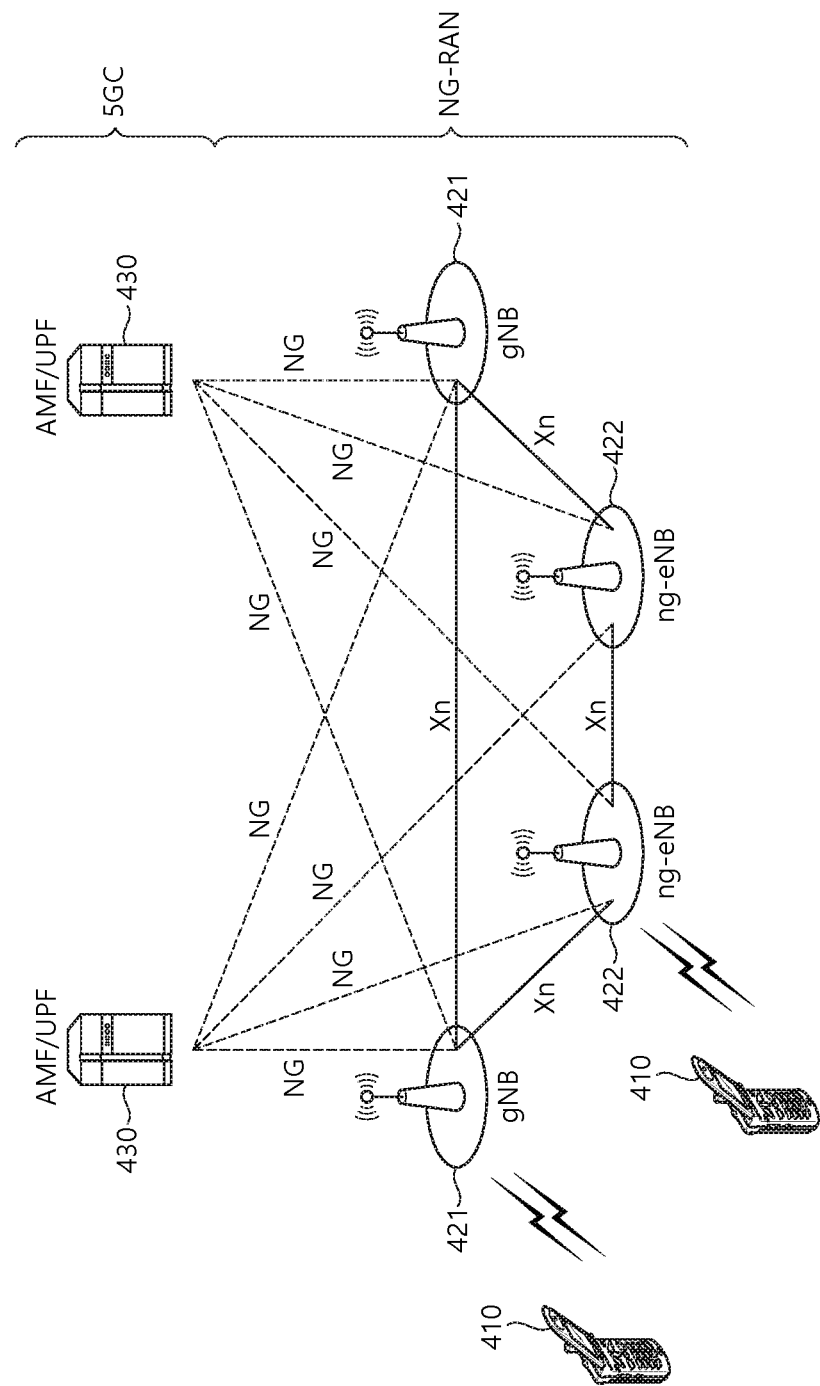
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW).

The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
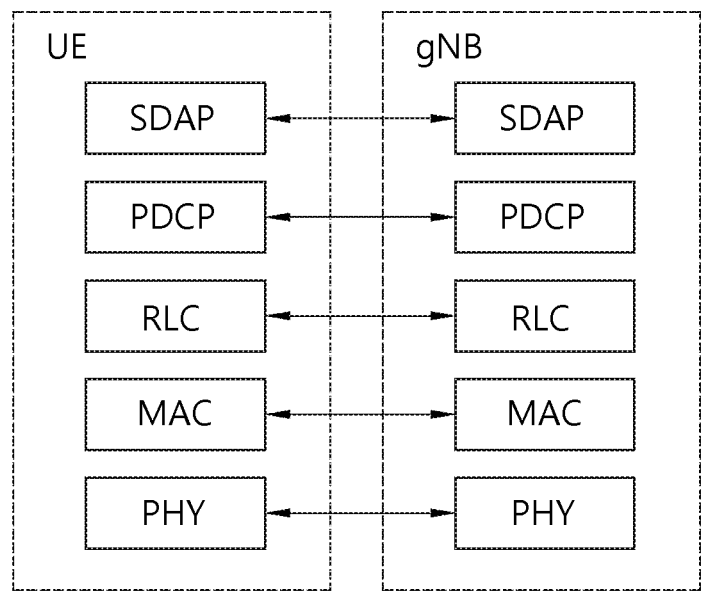
FIG. 5 shows a block diagram of a user plane protocol stack to which the technical features of the present invention can be applied.
Figure 6:
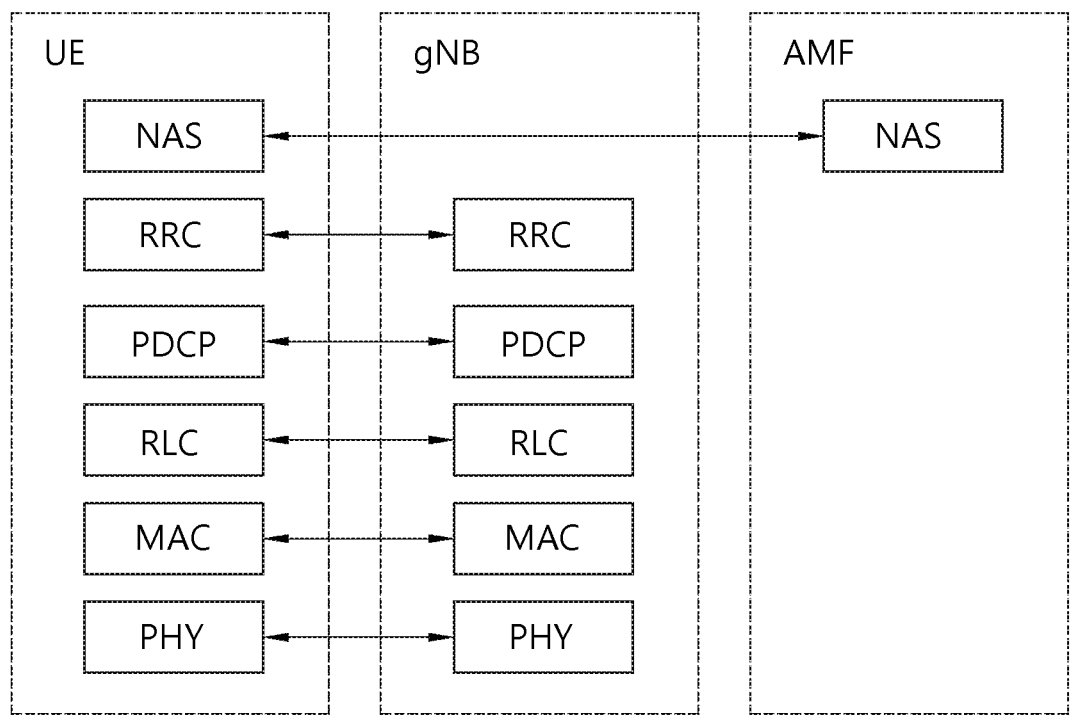
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

The RRC inactive state is described in detail. The following description of the RRC inactive state will be described by taking NR as an example, but it can be applied to LTE-A without loss of generality. For example, in the following description, NG-RAN node/gNB may be replaced with eNB and/or more generally BS, and AMF may be replaced with MME.

The RRC inactive state applies to NG-RAN node. The AMF, based on network configuration, may provide RRC inactive assistance information to the NG-RAN node, to assist the NG-RAN's decision whether the UE can be sent to RRC inactive state.

The RRC inactive assistance information includes at least one of the followings.

UE specific DRX values

The registration area provided to the UE

Periodic registration update timer

If the AMF has enabled mobile initiated connection only (MICO) mode for the UE, an indication that the UE is in MICO mode.

Information from the UE permanent identifier that allows the NG-RAN node to calculate the UE's RAN paging occasions.

The RRC inactive assistance information mentioned above is provided by the AMF during N2 activation with the (new) serving NG-RAN node (i.e. during registration, service request, handover) to assist the NG-RAN node's decision whether the UE can be sent to RRC inactive state. RRC inactive state is part of RRC state machine, and it is up to the NG-RAN node to determine the conditions to enter RRC inactive state. If any of the parameters included in the RRC inactive assistance information changes as the result of NAS procedure, the AMF shall update the RRC inactive assistance information to the NG-RAN node.

When the UE is in connection management connected state (CM-CONNECTED), if the AMF has provided RRC inactive assistance information, the NG-RAN node may decide to move a UE to CM-CONNECTED with RRC inactive state.

The state of the N2 and N3 reference points are not changed by the UE entering CM-CONNECTED with RRC inactive state. A UE in RRC inactive state is aware of the RAN notification area.

The 5GC network is not aware of the UE transitions between CM-CONNECTED with RRC_CONNECTED and CM-CONNECTED with RRC inactive state, unless the 5GC network is notified via N2 notification procedure.

At transition into CM-CONNECTED with RRC inactive state, the NG-RAN node configures the UE with a periodic RAN notification area update timer taking into account the value of the periodic registration update timer value indicated in the RRC inactive assistance information, and uses a guard timer with a value longer than the RAN notification area update timer value provided to the UE.

If the periodic RAN notification area update guard timer expires in NG-RAN node, the NG-RAN node shall initiate access network (AN) release procedure.

When the UE is in CM-CONNECTED with RRC inactive state, the UE performs PLMN selection procedures for connection management idle state (CM-IDLE).

When the UE is CM-CONNECTED with RRC inactive state, the UE may resume the RRC connection due to at least one of the followings.

UL data pending

Mobile originated (MO) NAS signaling procedure

As a response to RAN paging

Notifying the network that it has left the RAN notification area

Upon periodic RAN update timer expiration.

If the UE resumes the connection in a different NG-RAN node within the same PLMN, the UE AS context is retrieved from the old NG-RAN node and a procedure is triggered towards the CN.

If the RAN paging procedure is not successful in establishing contact with the UE, the procedure shall be handled by the network as follows.

If NG-RAN node has at least one pending NAS PDU for transmission, the NG-RAN node shall initiate the AN release procedure to move the UE CM state in the AMF to CM-IDLE and indicate to the AMF the NAS non-delivery.

If NG-RAN node has only pending user plane data for transmission, the NG-RAN node may keep the N2 connection active or initiate the AN release procedure based on local configuration in NG-RAN node.

The user plane data which triggers the RAN paging can be lost, e.g. in the case of RAN paging failure.

If a UE in CM-CONNECTED with RRC inactive state performs cell selection to GERAN/UTRAN/E-UTRAN, it shall follow idle mode procedures of the selected RAT.

In addition, a UE in CM-CONNECTED state with RRC inactive state shall enter CM-IDLE and initiates the NAS signaling recovery in at least one of the following cases.

If RRC resume procedure fails;

If the UE receives core network paging;

If the periodic RAN notification area update timer expires and the UE cannot successfully resume the RRC connection;

In any other failure scenario that cannot be resolved in RRC inactive state and requires the UE to move to CM-IDLE.

When the UE is in CM-CONNECTED with RRC inactive state, if NG-RAN node has received location reporting control message from AMF with the reporting type indicating single stand-alone report, the NG-RAN node shall perform RAN paging before reporting the location to AMF.

When the UE is in CM-CONNECTED with RRC inactive state, if NG-RAN node has received location reporting control message from AMF with the reporting type indicating continuously reporting whenever the UE changes cell, the NG-RAN node shall send a location report message to AMF including UE's last known location with time stamp.

When the UE is CM-CONNECTED with RRC inactive state, if the AMF receives Nudm_UEContextManagement_DeregistrationNotification from user data management (UDM), the AMF shall initiate AN release procedure.

When UE is in CM-CONNECTED with RRC inactive state, if NG-RAN node has received location reporting control message from AMF with the reporting type of the area of interest based reporting, the NG-RAN node shall send a location report message to AMF including UE presence in the area of interest (i.e. IN, OUT, or UNKNOWN) and the UE's last known location with time stamp.

Figure 7:
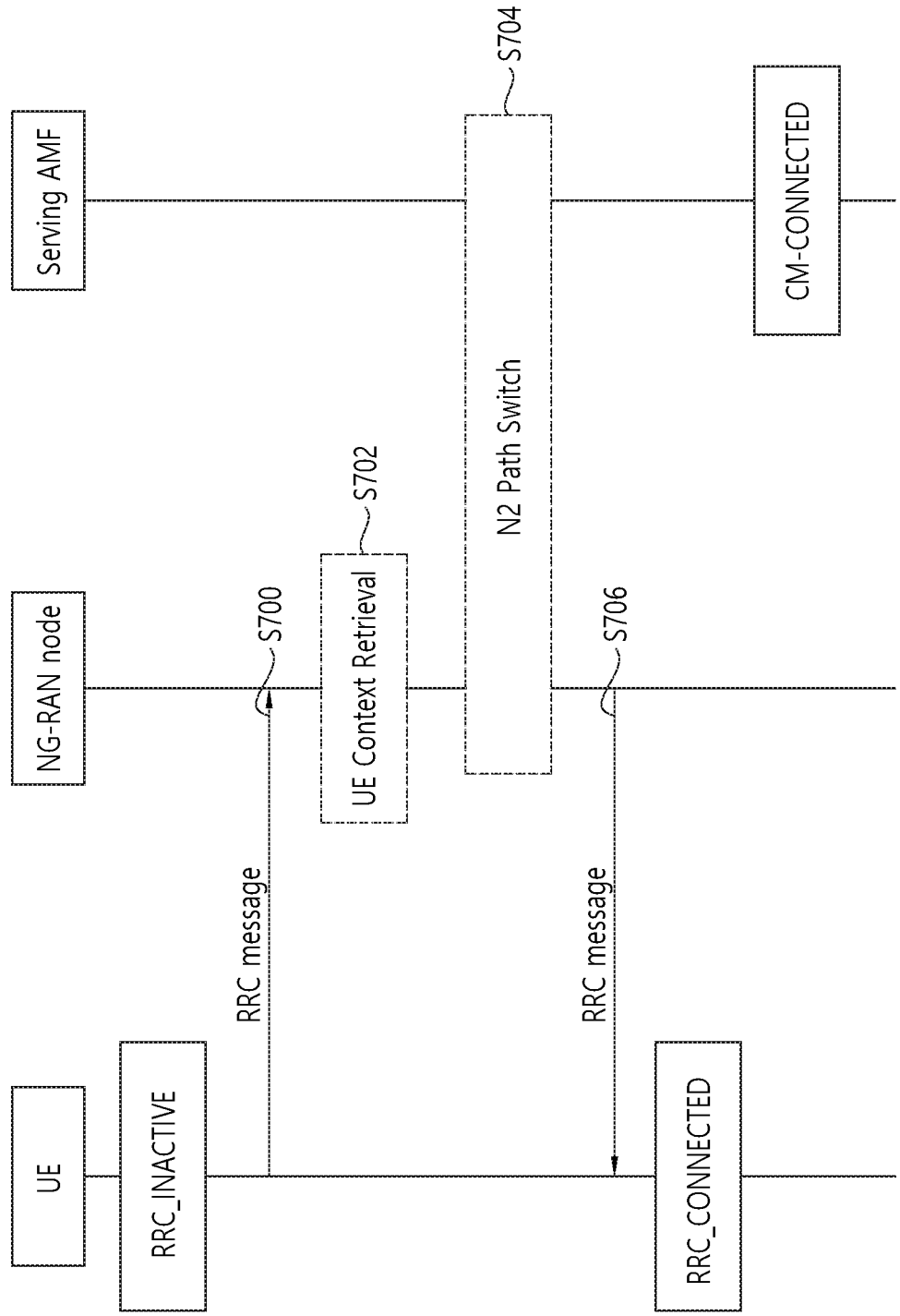
FIG. 7 shows an example of a connection resume procedure to which the technical features of the present invention can be applied.

FIG. 7 shows an example of a connection resume procedure to which the technical features of the present invention can be applied. The connection resume procedure is used by the UE to perform RRC inactive to RRC connected state transition.

In step S700, while the UE is in RRC_INACTIVE, the UE transmits an RRC message to the NG-RAN node to initiate the transition from RRC_INACTIVE to RRC_CONNECTED. The UE provides its resume ID needed by the NG-RAN node to access the UE's stored context. The RRC message may be RRCConnectionResumeRequest message which will be described in detail below.

In step S702, the NG-RAN node may conditionally perform UE context retrieval. The UE context retrieval is performed when the UE context associated with the UE attempting to resume its connection is not locally available at the accessed NG-RAN node.

In step S704, the NG-RAN node may conditionally perform N2 path switch procedure towards the serving AMF. If the target NG-RAN node is different from the old NG-RAN node, the serving NG-RAN node initiates N2 path switch procedure and including Xn data forwarding. The NG-RAN node sends UE notification message to report that the UE is in RRC_CONNECTED if the AMF requested N2 notification to the NG-RAN node.

In step S706, the NG-RAN node transmits an RRC message to the UE to confirm to the UE that the UE has entered RRC_CONNECTED. The RRC message includes resume ID of the UE.

Table 1 shows an example of RRCConnectionResumeRequest message. The RRCConnectionResumeRequest message may be the RRC message which is transmitted in step S700 of FIG. 7. The RRCConnectionResumeRequest message is used to request the resumption of a suspended RRC connection. The SRB for the RRCConnectionResumeRequest message may be SRB0. The RRCConnectionResumeRequest message may be transmitted via logical channel CCCH.

TABLE 1

```
-- ASN1START
RRCConnectionResumeRequest-r13 ::=    SEQUENCE {
criticalExtensions                    CHOICE {
    rrcConnectionResumeRequest-r13            RRCConnectionResumeRequest-r13-
IEs,
    criticalExtensionsFuture          SEQUENCE { }
}
}
RRCConnectionResumeRequest-r13-IEs ::= SEQUENCE {
resumeIdentity-r13                    CHOICE {
    resumeID-r13                              ResumeIdentity-r13,
    truncatedResumeID-r13                     BIT STRING (SIZE (24))
},
shortResumeMAC-I-r13                  BIT STRING (SIZE (16)),
resumeCause-r13                       ResumeCause,
spare                                 BIT STRING (SIZE (1))
}
ResumeCause ::= ENUMERATED {
            emergency, highPriorityAccess, mt-Access, mo-Signalling,
            mo-Data, delayTolerantAccess-v1020, mo-VoiceCall-v1280,
spare1}
-- ASN1STOP
```

Referring to Table 1, the resumeCause field provides the resume cause for the RRC connection resume request as provided by the upper layers. The resumeIdentity field indicates UE identity to facilitate UE context retrieval at BS. The shortResumeMAC-I field indicates authentication token to facilitate UE authentication at BS.

Transport of NAS messages and early data transmission (EDT) are described. The following description of the RRC inactive state will be described by taking LTE-A as an example, but it can be applied to NR without loss of generality. For example, in the following description, eNB may be replaced with NG-RAN node/gNB and/or more generally BS, and MME may be replaced with AMF.

The AS provides reliable in-sequence delivery of NAS messages in a cell. During handover, message loss or duplication of NAS messages can occur.

In E-UTRAN, NAS messages are either concatenated with RRC messages or carried in RRC without concatenation. Upon arrival of concurrent NAS messages for the same UE requiring both concatenation with RRC for the high priority queue and also without concatenation for the lower priority queue, the messages are first queued as necessary to maintain in-sequence delivery.

In DL, when an EPS bearer establishment or release procedure is triggered, or for EDT, the NAS message should normally be concatenated with the associated RRC message. When the EPS bearer is modified and when the modification also depends on a modification of the radio bearer, the NAS message and associated RRC message should normally be concatenated. Concatenation of DL NAS with RRC message is not allowed otherwise. In UL concatenation of NAS messages with RRC message is used only for transferring the initial NAS message during connection setup and for EDT. Initial direct transfer is not used in E-UTRAN and no NAS message is concatenated with RRC connection request.

Multiple NAS messages can be sent in a single DL RRC message during EPS bearer establishment or modification. In this case, the order of the NAS messages in the RRC message shall be kept the same as that in the corresponding S1-AP message in order to ensure the in-sequence delivery of NAS messages.

NAS messages are integrity protected and ciphered by PDCP, in addition to the integrity protection and ciphering performed by NAS.

EDT allows one UL data transmission optionally followed by one DL data transmission during the random access procedure.

EDT is triggered when the upper layers have requested the establishment or resumption of the RRC connection for MO data (i.e. not signaling or short message service (SMS)) and the UL data size is less than or equal to a transport block size (TBS) indicated in the system information. EDT is not used for data over the control plane when using the user plane cellular IoT (CIoT) EPS optimizations.

EDT may be only applicable to bandwidth reduced low complexity (BL) UEs, UEs in enhanced coverage and/or narrowband IoT (NB-IoT) UEs.

Figure 8:
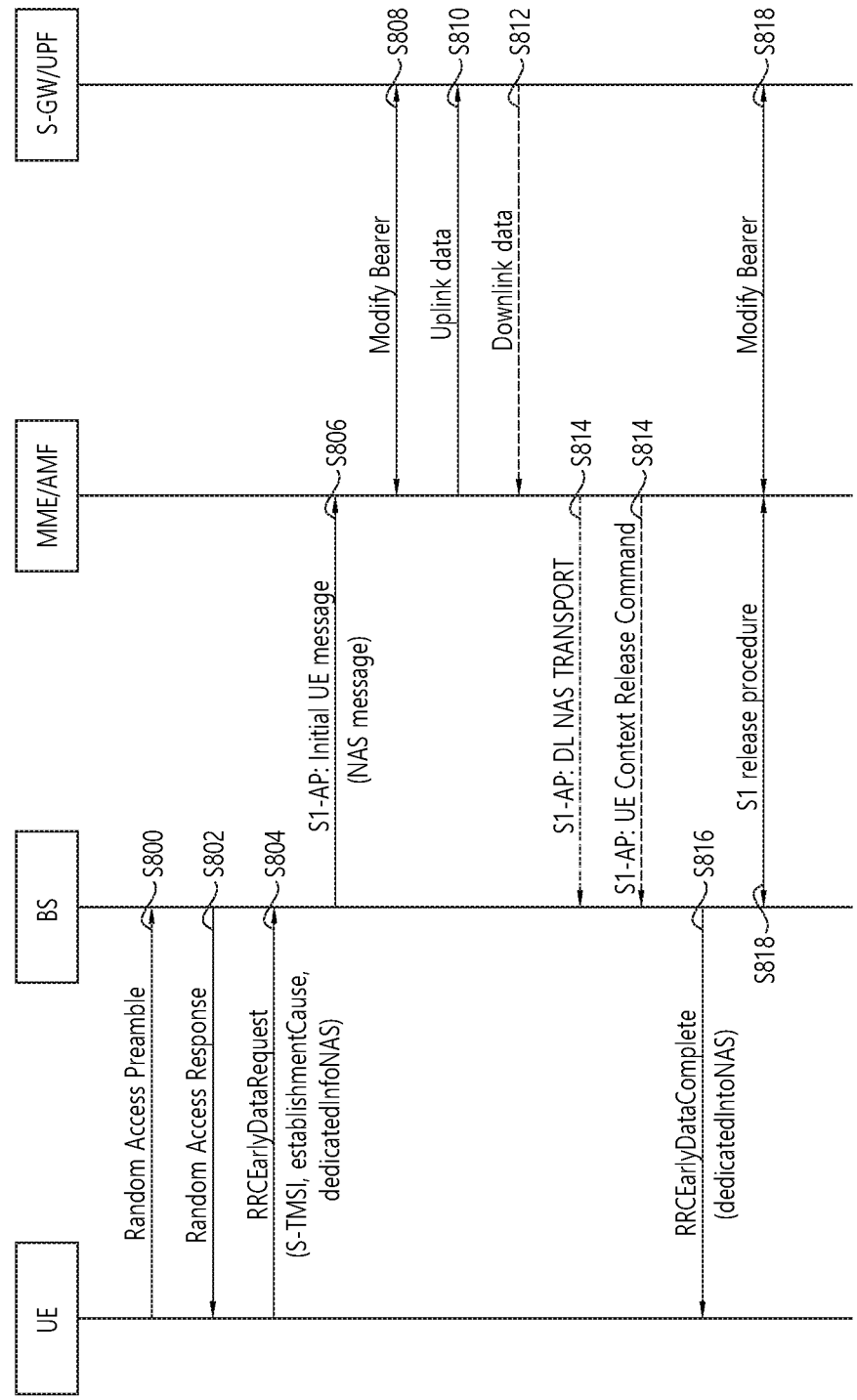
FIG. 8 shows an example of EDT for control plane CIoT EPS optimizations to which the technical features of the present invention can be applied.

FIG. 8 shows an example of EDT for control plane CIoT EPS optimizations to which the technical features of the present invention can be applied. EDT for control plane (CP) CIoT EPS optimizations (simply as CP solution) is characterized as below.

UL user data are transmitted in a NAS message concatenated in UL RRCEarlyDataRequest message on CCCH.

DL user data are optionally transmitted in a NAS message embedded in DL RRCEarlyDataComplete message on CCCH.

There is no transition to RRC_CONNECTED.

Referring to FIG. 8, upon connection establishment request for MO data from the upper layers, the UE initiates the EDT procedure and selects a random access preamble configured for EDT. In step S800, the UE transmits the random access preamble to the BS, and in step S802, the BS transmits a random access response to the UE as a response to the random access preamble.

In step S804, the UE sends RRCEarlyDataRequest message concatenating the user data on CCCH. The RRCEarlyDataRequest message may further include SAE temporary mobile subscriber identity (S-TMSI) and/or establishment cause.

In step S806, the BS initiates the S1-AP initial UE message procedure to forward the NAS message and establish the S1 connection.

In step S808, the MME requests the S-GW to re-activate the EPS bearers for the UE.

In step S810, the MME sends the UL data to the S-GW.

In step S812, if DL data are available, the S-GW sends the DL data to the MME.

In step S814, if DL data are received from the S-GW, the MME forwards the DL data to the BS. If no further data are expected, the MME can release the connection immediately.

In step S816, if no further data are expected, the BS can send the RRCEarlyDataComplete message on CCCH to keep the UE in RRC_IDLE. If the DL data were received in step S814, they are concatenated in RRCEarlyDataComplete message.

In step S818, the S1 connection is released and the EPS bearers are deactivated.

If the MME or the BS decides to move the UE in RRC_CONNECTED, RRCConnectionSetup message is sent in step S816 to fall back to the legacy RRC connection establishment procedure.

Figure 9:
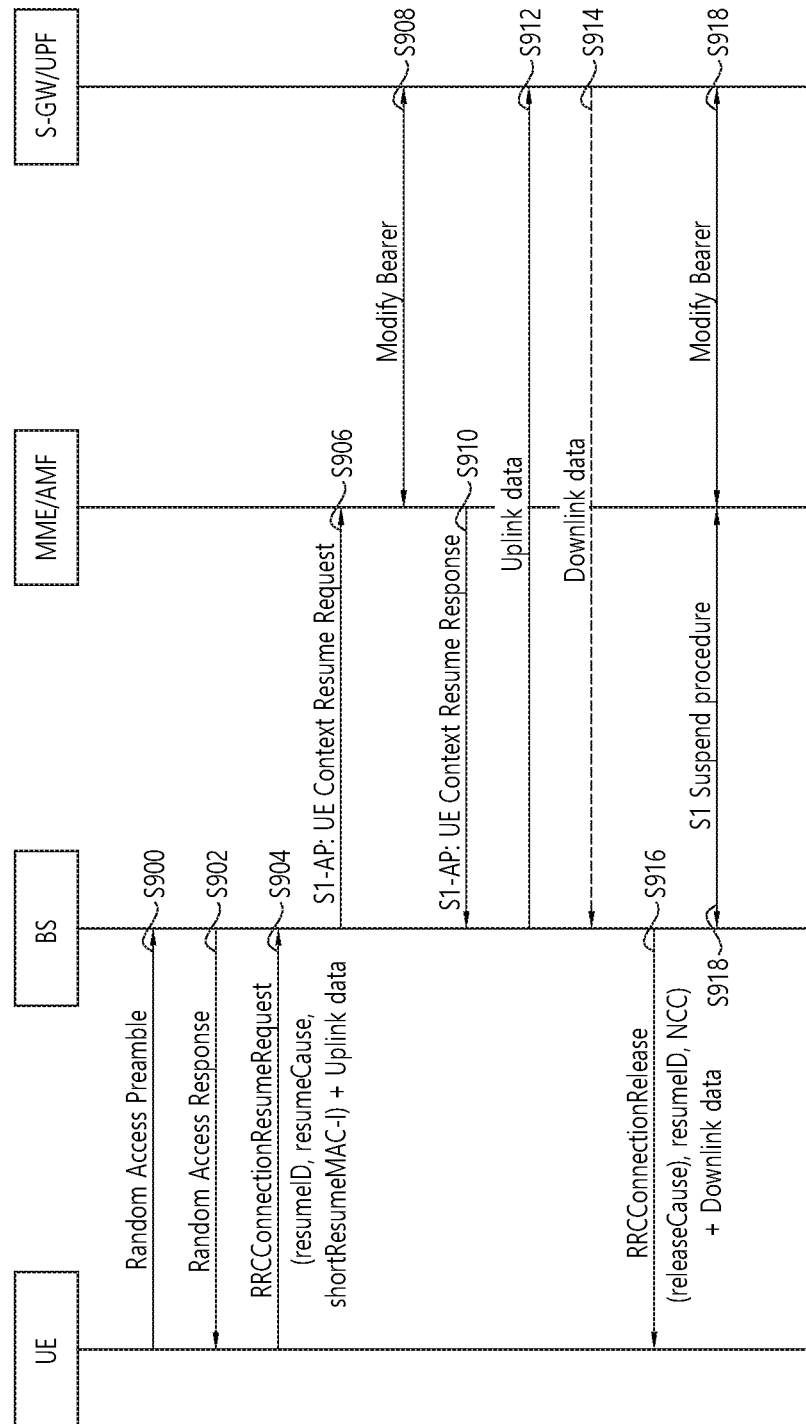
FIG. 9 shows an example of EDT for user plane CIoT EPS optimizations to which the technical features of the present invention can be applied.

FIG. 9 shows an example of EDT for user plane CIoT EPS optimizations to which the technical features of the present invention can be applied. EDT for user plane (UP) CIoT EPS optimizations (simply as UP solution) is characterized as below.

UL user data are transmitted on DTCH multiplexed with UL RRCConnectionResumeRequest message on CCCH.

DL user data are optionally transmitted on DTCH multiplexed with DL RRCConnectionRelease message on DCCH.

The user data in UL and DL are ciphered. The keys are derived using the NextHopChainingCount provided in the RRCConnectionRelease message of the previous RRC connection.

There is no transition to RRC_CONNECTED.

Referring to FIG. 9, upon connection resumption request for MO data from the upper layers, the UE initiates the EDT procedure and selects a random access preamble configured for EDT. In step S900, the UE transmits the random access preamble to the BS, and in step S902, the BS transmits a random access response to the UE as a response to the random access preamble.

In step S904, the UE sends an RRCConnectionResumeRequest to the BS, including its Resume ID, the establishment cause, and an authentication token (i.e. shortResumeMAC-I). The UE resumes all SRBs and DRBs, derives new security keys using the next hop chaining counter (NCC) provided in the RRCConnectionRelease message of the previous connection and re-establishes the AS security. The user data are ciphered and transmitted on DTCH multiplexed with the RRCConnectionResumeRequest message on CCCH.

In step S906, the BS initiates the S1-AP context resume procedure to resume the S1 connection and re-activate the S1-U bearers.

In step S908, the MME requests the S-GW to re-activate the S1-U bearers for the UE.

In step S910, the MME confirms the UE context resumption to the BS.

In step S912, the UL data are delivered to the S-GW.

In step S914, if DL data are available, the S-GW sends the DL data to the BS.

In step S916, if no further data are expected from the S-GW, the BS can send the RRCConnectionRelease message to keep the UE in RRC_IDLE. The message includes the release Cause set to rrc-Suspend, the resumeID and the NextHopChainingCount which are stored by the UE. If DL data were received in step S914, they are sent ciphered on DTCH multiplexed with the RRCConnectionRelease message on DCCH.

In step S918, the S1 connection is suspended and the S1-U bearers are deactivated.

If the MME or BS decides the UE to move in RRC_CONNECTED, RRCConnectionResume message is sent in step S916 to fall back to the legacy RRC Connection resume procedure.

Fallback scenarios of EDT is described. One condition to initiate EDT is that the size of data (UL data plus RRC message for MSG3) needs to be equal to or smaller than the maximum TBS broadcast in system information for the selected coverage enhancement (CE) level. Another condition is that the UL grant received in random access response (RAR) needs to correspond to the maximum TBS broadcast in the system information for the selected CE level. A UE initiating EDT has to fallback to legacy procedure when the MSG3 size becomes larger than the maximum TBS broadcast in system information for the selected next CE level during RACH procedure and/or UL grant received in RAR for EDT is for legacy MSG3.

(1) Scenario 1: Size of MSG3 is larger than the maximum TBS broadcast in system information for the selected CE level during the RACH procedure Suppose that the UE starts the RACH procedure for EDT in CE level x, but the UE fails to receive any response corresponding to the transmitted random access preamble for EDT during the random access response window. In case the UE satisfies the condition (PREAMBLE_ TRANSMISSION_ COUNTER_CE=maxNumPreambleAttemptCE for the corresponding enhanced coverage level+1), the UE considers to be in the next CE level for the next preamble transmission attempt.

In this case, the size of MSG3 in the current MSG3 buffer and/or potential size of UL data plus RRC message for MSG3 could be larger than the maximum TBS broadcast in the system information for the selected next CE level (i.e. x+1). This may mean that the UE now does not meet the condition to initiate the EDT. The UE has to indicate the upper layer that selected CE level has changed and EDT condition has to be re-evaluated. If the condition to initiate the EDT is not satisfied, RRC layer can indicate the lower layer not to initiate EDT.

It is possible that the CE level is changed during the preamble transmission attempts after the contention resolution has failed. In EDT for UP solution, this may mean that MSG3 buffer contains a PDU which contains the SDU in CCCH multiplexed with the SDU in DTCH (i.e. at least one successfully received random access response within this RACH procedure or MSG3 buffer is not empty). As legacy MSG3 transmission is in CCCH (i.e. RLC™ mode), a new RRCConnectionResumeRequest message is required for the next attempt in preamble transmission in case of fallback to legacy procedure.

Similarly, in EDT for CP solution, the UE has to flush the MSG3 buffer for any data. If the UL data is still available for transmission, a new RRCConnectionRequest message is required for the next attempt in preamble transmission.

(2) Scenario 2: UL grant received in RAR is for legacy MSG3

The UE may have initiated the EDT and transmitted the preamble associated with EDT but the UL grant received in RAR may be for legacy MSG3. In this case, the UE has to fallback to legacy RRC connection establishment/resume procedure.

For both fallback scenarios, the RRC layer may always construct two RRC messages for MSG3, one for legacy MSG3 and other for EDT MSG3. That is, the RRC layer has to construct two RRC messages in parallel and store in CCCH buffer. If UL grant for EDT is received in RAR, the multiplexing and assembly entity may obtain new correct MAC PDU from the RRC message for EDT in CCCH for MSG3 buffer. In this case, the UE may have to keep storing the other legacy RRC message for later use in case of fallback in both CP and UP solution. When the UE detects EDT cannot be used, the UE may flush MSG3 buffer, if any. When the UL grant for legacy is received in RAR, the MAC layer may ask multiplexing and assembly entity to obtain new correct MAC PDU from the data in CCCH for legacy MSG3. In UP solution, even if legacy RRCConnectionResumeRequest message is used for EDT, another copy of RRCConnectionResumeRequest message may still be needed for fallback if multiplexing of CCCH and DTCH was already done. The UE may continue the RACH procedure from the point where the UE detected the EDT problem.

Constructing two RRC messages (one for legacy MSG3 and other for EDT MSG3) has complexity of maintaining two RRC messages in the CCCH. But, the UE does not have to wait until RRC constructs new RRC message to start the preamble transmission. Furthermore the UE can use the provided legacy UL grant received in RAR and continue RACH procedure from the point where the EDT problem was detected.

In other words, although the UE initiates the EDT, the UE may fall back to the legacy procedure. For example, if the UL grant received in RAR is small for the EDT, or if the allowed TBs for the changed CE level is small for the EDT, or if the UE does not receive the response message after MSG3 transmission, the UE should perform the legacy procedure for fallback of the EDT. For the legacy procedure, the UE may send RRCConnectionRequest message for CP solution and RRCConnectionResumeRequest for UP solution. Both messages may be transmitted via CCCH. If the UE regenerates the appropriate RRC message in MSG3 buffer for the legacy procedure, it may require more processing time during the RACH procedure. To reduce overhead of the RACH procedure, the UE may submit two versions of RRC messages, one is for the EDT and the other is for the legacy procedure, to the lower layers when the UE initiates the EDT.

However, submission of two versions of RRC messages to the low layers may require modification of the legacy message transmission mechanism because the legacy message transmission mechanism is not designed to process two versions of RRC messages. As the UE should transmit only one of the two versions of RRC messages in MSG3 buffer, another RRC message submitted in the lower layers should be discarded at certain point of time.

Figure 10:
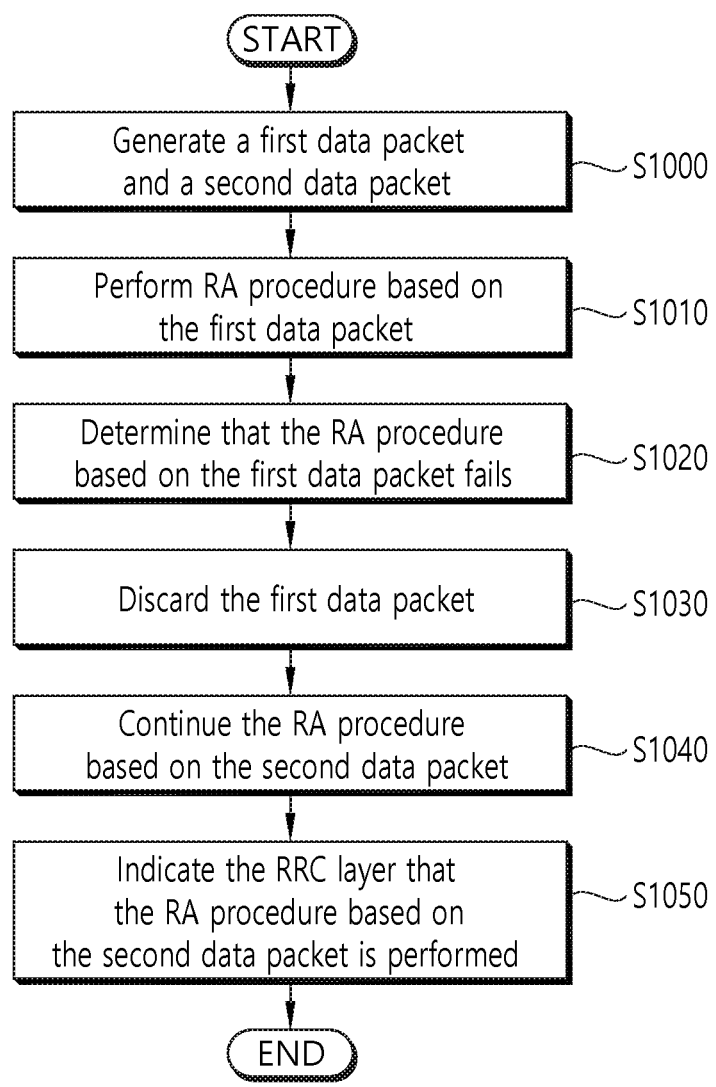
FIG. 10 shows an example of a method for discarding data among associated transmission buffers according to the present invention.

FIG. 10 shows an example of a method for discarding data among associated transmission buffers according to the present invention. This embodiment may be performed by a UE and/or wireless device. The UE and/or wireless device may be in communication with at least one of a user equipment, a network, and/or autonomous vehicles other than the UE/wireless device.

In step S1000, the UE generates a first data packet and a second data packet. The first data packet and the second data packet may be used for transmission of MSG3 of the RA procedure. The first data packet may include RRC message for EDT procedure in which data transmission is performed via the MSG3 of the RA procedure, and the second data packet may include an RRC message for a legacy procedure for fallback from the EDT procedure. The RRC message for the EDT procedure may include an RRC early data request (RRCEarlyDataRequest) message (for CP solution) or an RRC connection resume request (RRCConnectionResumeRequest) message (for UP solution), and the RRC message for the legacy procedure may include an RRC connection request (RRCConnectionRequest) message (for CP solution) or an RRC connection resume request (RRCConnectionResumeRequest) message (for UP solution). The first data packet and the second data packet may be stored in two separated buffers in RLC layer, respectively. For this, the UE may maintain the two separate buffers in RLC layer. The first data packet may be stored in a default buffer and the second packet may be stored in another buffer. The first data packet may have a higher priority than the second data packet in a logical channel prioritization (LCP).

In step S1010, the UE performs the RA procedure based on the first data packet. In the RA procedure, the UE transmits a preamble indicating that the UE intends to perform the EDT procedure. The UE attempts to receive RAR including a UL grant for MSG3 transmission, and to transmit MSG3 based on the first data packet, i.e. RRC message for the EDT procedure.

In step S1020, the UE determines that the RA procedure based on the first data packet fails. The UE may declare the failure of the RA procedure based on the first data packet when at least one of the followings occur. The MAC layer may declare the failure of the RA procedure.

If a size of the UL grant received in RAR is smaller than a size of the first data packet, or If the UE changes the CE level and a size of the UL grant is smaller than the allowed TBS for the current CE level, or RAR reception fails, or Contention resolution fails.

In step S1030, the UE discards the first data packet. The RLC layer may discard the first data packet even if the first data packet is not successfully transmitted to the network.

In step S1040, the UE continues the RA procedure based on the second data packet. In step S1050, the UE indicates the RRC layer that the RA procedure based on the second data packet is performed. The MAC layer and/or RLC layer may indicate the RRC layer that the fallback procedure is performed so that the RRC layer performs the legacy procedure.

If the UE completes the RA procedure based on the second data packet, the UE may discard the second data packet. The UE may further indicate the RRC layer that the RA procedure based on the second data packet is completed so that the RRC layer performs retransmission.

Alternatively, if the UE succeeds the RA Procedure based on the first data packet, the UE may discard the first data packet and the second data packet. The UE may discard the second data packet even if the UE does not transmit the second data packet to the network at all. The UE may flush the buffer that contains the first data packet and the second data packet.

According to the embodiment of the present invention shown in FIG. 10, when two versions of RRC messages are submitted to the lower layers and when the EDT procedure fails, the UE can discard the RRC message for the EDT procedure and can continue the RA procedure by using the RRC message for the legacy procedure. Therefore, processing time of the RA procedure can be reduced.

Various scenarios to which the technical features of the present invention can be applied are described in detail below.

1. Scenario 1

Figure 11:
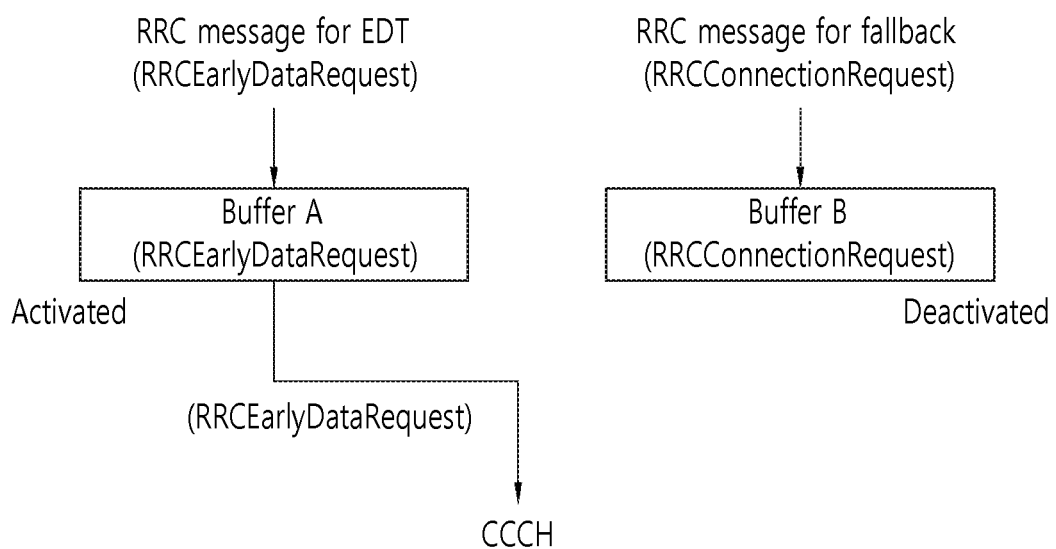
FIG. 11 shows an example of an operation in the TM RLC for CP solution according to an embodiment of the present invention.

FIG. 11 shows an example of an operation in the TM RLC for CP solution according to an embodiment of the present invention.

When the UE initiates EDT for CP solution, the RRC layer generates two RRC messages, one is for EDT (i.e. RRCEarlyDataRequest) and the other is for the legacy RRC connection establishment procedure (i.e. RRCConnectionRequest) to be used if the UE falls back to the legacy procedure. Each RRC message is stored in each associated buffer. Referring to FIG. 11, the RRC message for EDT is stored in buffer A, and the RRC message for the legacy procedure is stored in buffer B. The buffer A may be a default buffer.

If the MAC layer indicates a transmission opportunity for EDT, the RRC message for EDT in the buffer A is delivered to the MAC layer for transmission. At successful completion of the RACH procedure, the UE discards data in the buffer A and buffer B. At failed completion of the RACH procedure, the UE discards data in the buffer A if the UE does not perform retransmission for EDT. The UE discards data in the buffer B unless the UE attempts to transmit the legacy RRC message without restarting the RACH procedure. If the UE has attempted to transmit the legacy RRC message after EDT failure, the UE discards data in the buffer B at completion of the RACH procedure.

2. Scenario 2

Figure 12:
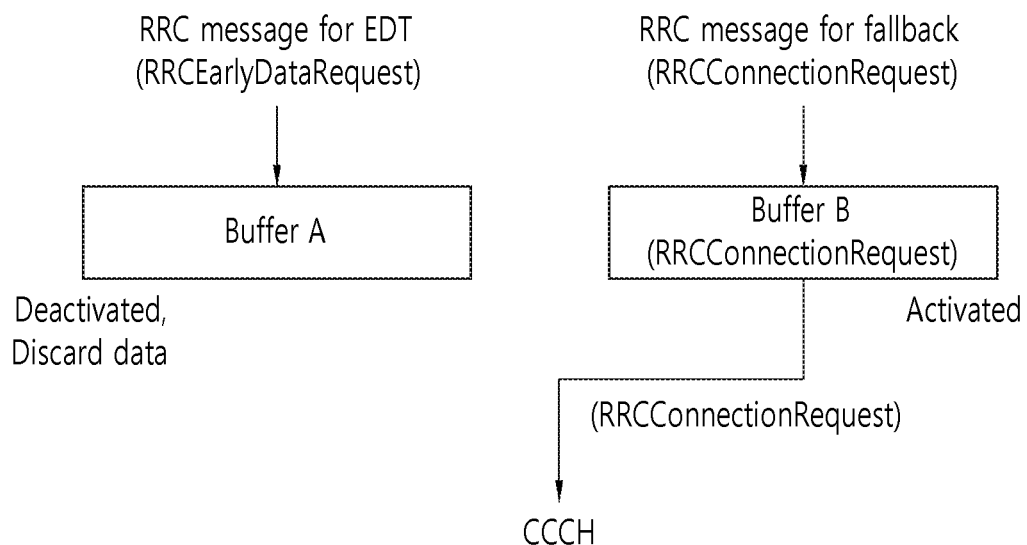
FIG. 12 shows another example of an operation in the TM RLC for CP solution according to an embodiment of the present invention.

FIG. 12 shows another example of an operation in the TM RLC for CP solution according to an embodiment of the present invention.

When the UE initiates EDT for CP solution, the RRC layer generates two RRC messages, one is for EDT (i.e. RRCEarlyDataRequest) and the other is for the legacy RRC connection establishment procedure (i.e. RRCConnectionRequest) to be used if the UE falls back to the legacy procedure. Each RRC message is stored in each associated buffer. Referring to FIG. 12, the RRC message for EDT is stored in buffer A, and the RRC message for the legacy procedure is stored in buffer B. The buffer A may be a default buffer.

If the MAC layer indicates a transmission opportunity for the legacy procedure (or, indicates that a size of the UL grant received in RAR is small for EDT), the RRC message for the legacy procedure in the buffer B is delivered to the MAC layer for transmission, and the UE discards data in the buffer A. At completion of the RACH procedure, the UE discards data in the buffer B.

3. Scenario 3

Figure 13:
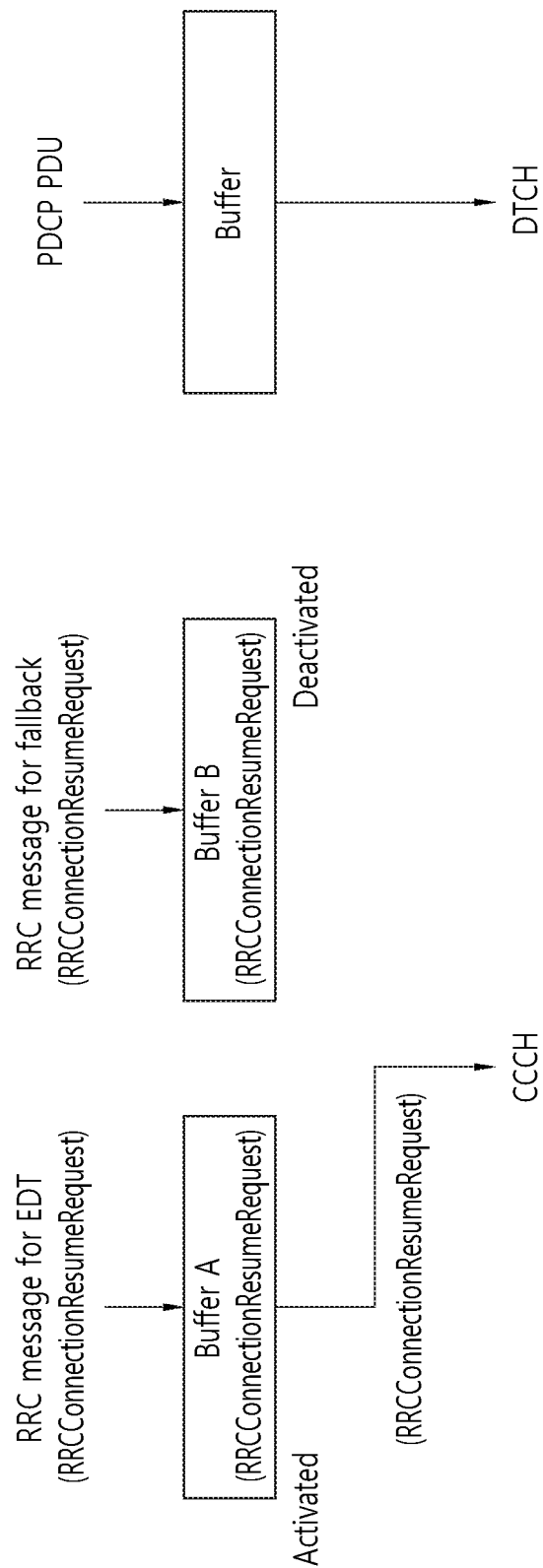
FIG. 13 shows an example of an operation in the TM RLC and AM RLC for UP solution according to an embodiment of the present invention.

FIG. 13 shows an example of an operation in the TM RLC and AM RLC for UP solution according to an embodiment of the present invention.

When the UE initiates EDT for UP solution, the RRC layer generates two RRC messages, one is for EDT (i.e. RRCConnectionResumeRequest) and the other is for the legacy RRC connection resume procedure (i.e. RRCConnectionResumeRequest) to be used if the UE falls back to the legacy procedure. That is, both RRC messages may be same. Each RRC message is stored in each associated buffer. Referring to FIG. 13, the RRC message for EDT is stored in buffer A, and the RRC message for the legacy procedure is stored in buffer B. The buffer A may be a default buffer. The user data is stored in a transmission buffer in another RLC entity (AM RLC) and there is no associated buffer for the user data.

If the MAC layer indicates a transmission opportunity for EDT, the RRC message for EDT in the buffer A and RLC data PDU in the AM RLC are delivered to the MAC layer for transmission. Then, the RRC message for EDT and data are multiplexed in MSG3 in the MAC layer. At successful completion of the RACH procedure, the UE discards all data in the buffer A and buffer B. Handling the PDCP PDU in a transmission buffer in the AM RLC may follow the legacy procedure. At failed completion of the RACH procedure, the UE discards data in the buffer A if the UE does not perform retransmission for EDT. The UE discards data in the buffer B unless the UE attempts to transmit the legacy RRC message without restarting the RACH procedure. If the UE has attempted to transmit legacy RRC message after EDT failure, the UE discards data in the buffer B at completion of RACH procedure. Handling the PDCP PDU in a transmission buffer in the AM RLC may follow the legacy procedure.

4. Scenario 4

Figure 14:
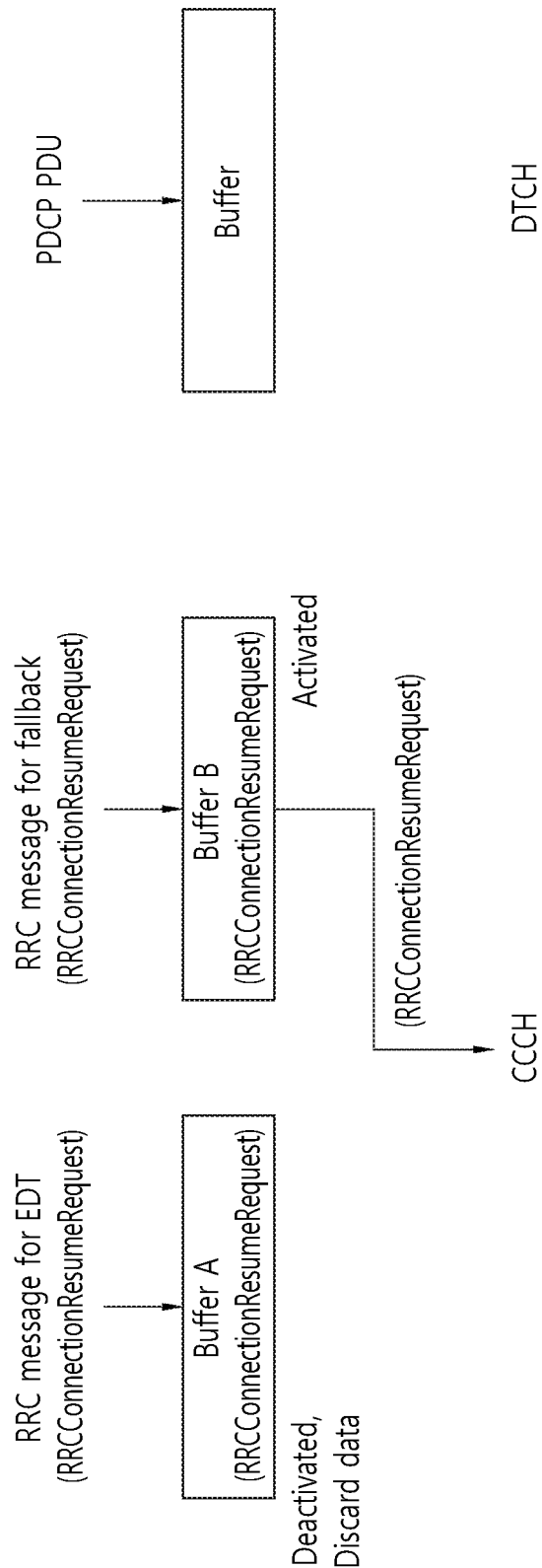
FIG. 14 shows another example of an operation in the TM RLC and AM RLC for UP solution according to an embodiment of the present invention.

FIG. 14 shows another example of an operation in the TM RLC and AM RLC for UP solution according to an embodiment of the present invention.

When the UE initiates EDT for UP solution, the RRC layer generates two RRC messages, one is for EDT (i.e. RRCConnectionResumeRequest) and the other is for the legacy RRC connection resume procedure (i.e. RRCConnectionResumeRequest) to be used if the UE falls back to the legacy procedure. That is, both RRC messages may be same. Each RRC message is stored in each associated buffer. Referring to FIG. 14, the RRC message for EDT is stored in buffer A, and the RRC message for the legacy procedure is stored in buffer B. The buffer A may be a default buffer. The user data is stored in a transmission buffer in another RLC entity (AM RLC) and there is no associated buffer for the user data.

If the MAC layer indicates a transmission opportunity for the legacy procedure (or, indicates that a size of the UL grant received in RAR is small for EDT), the RRC message for the legacy procedure in the buffer B is delivered to the MAC layer for transmission, and the UE discards data in the buffer A. No action may be required in the RLC AM entity. At completion of the RACH procedure, the UE discards data in the buffer B.

Figure 15:
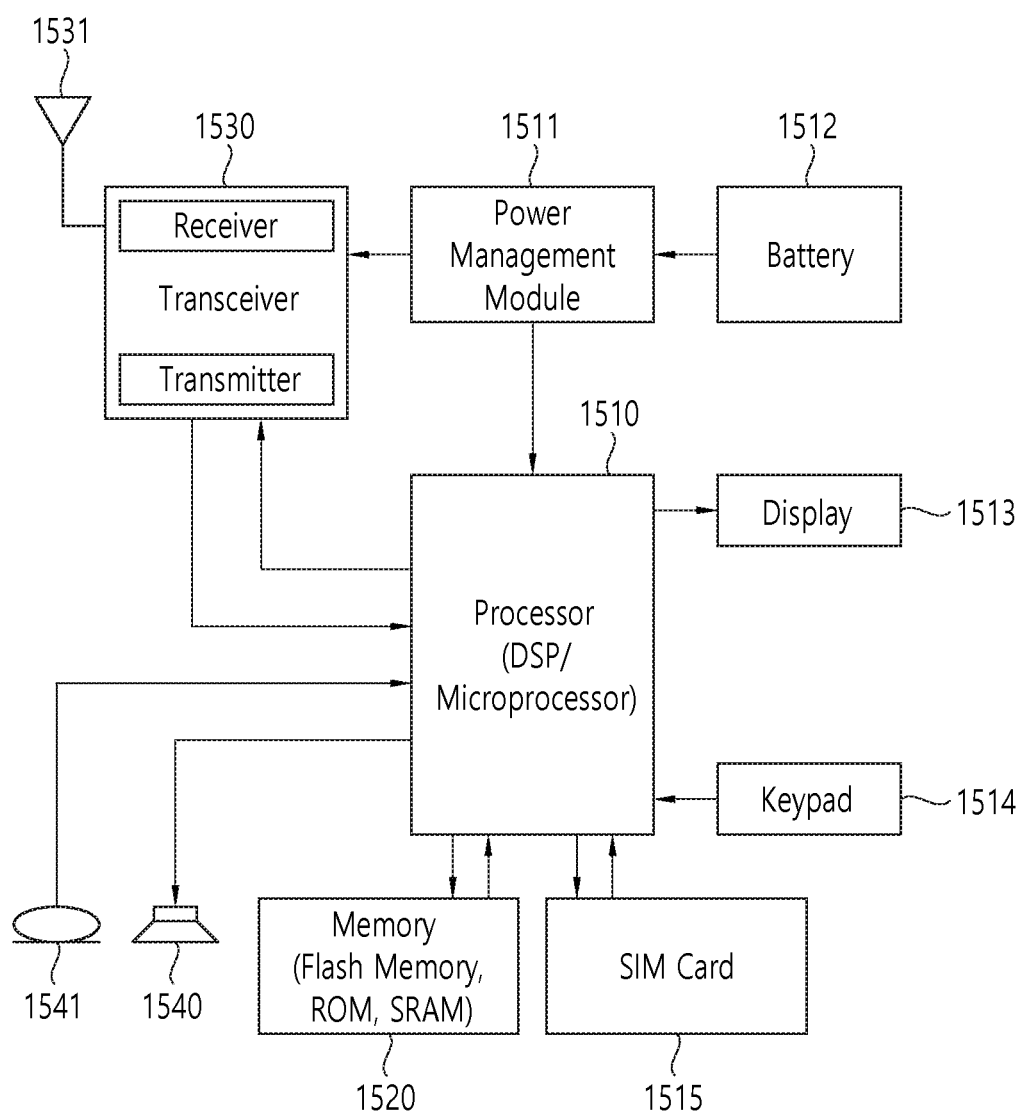
FIG. 15 shows a UE to which the technical features of the present invention can be applied.

FIG. 15 shows a UE to which the technical features of the present invention can be applied.

A UE includes a processor 1510, a power management module 1511, a battery 1512, a display 1513, a keypad 1514, a subscriber identification module (SIM) card 1515, a memory 1520, a transceiver 1530, one or more antennas 1531, a speaker 1540, and a microphone 1541.

The processor 1510 may be configured to implement proposed functions, procedures and/or methods described in this description. Layers of the radio interface protocol may be implemented in the processor 1510. The processor 1510 may include application-specific integrated circuit (ASIC), other chipset, logic circuit and/or data processing device. The processor 1510 may be an application processor (AP). The processor 1510 may include at least one of a digital signal processor (DSP), a central processing unit (CPU), a graphics processing unit (GPU), a modem (modulator and demodulator). An example of the processor 1510 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1510 may be configured to generate a first data packet and a second data packet. The first data packet and the second data packet may be used for transmission of MSG3 of the RA procedure. The first data packet may include RRC message for EDT procedure in which data transmission is performed via the MSG3 of the RA procedure, and the second data packet may include an RRC message for a legacy procedure for fallback from the EDT procedure. The RRC message for the EDT procedure may include an RRC early data request (RRCEarlyDataRequest) message, and the RRC message for the legacy procedure may include an RRC connection request (RRCConnectionRequest) message. The first data packet and the second data packet may be stored in two separated buffers in RLC layer, respectively. For this, the UE may maintain the two separate buffers in RLC layer. The first data packet may be stored in a default buffer and the second packet may be stored in another buffer. The first data packet may have a higher priority than the second data packet in a logical channel prioritization (LCP).

The processor 1510 may be configured to perform the RA procedure based on the first data packet. In the RA procedure, the processor 1510 may be configured to control the UE to transmit a preamble indicating that the UE intends to perform the EDT procedure. The processor 1510 may be configured to control the UE to attempt to receive RAR including a UL grant for MSG3 transmission, and to transmit MSG3 based on the first data packet, i.e. RRC message for the EDT procedure.

The processor 1510 may be configured to determine that the RA procedure based on the first data packet fails. The processor 1510 may be configured to declare the failure of the RA procedure based on the first data packet when at least one of the followings occur. The MAC layer may declare the failure of the RA procedure.
  If a size of the UL grant received in RAR is smaller than a size of the first data packet, or
  If the UE changes the CE level and a size of the UL grant is smaller than the allowed TBS for the current CE level, or
  RAR reception fails, or
  Contention resolution fails.

The processor 1510 may be configured to discard the first data packet. The RLC layer may discard the first data packet even if the first data packet is not successfully transmitted to the network.

The processor 1510 may be configured to continue the RA procedure based on the second data packet. The processor 1510 may be configured to indicate the RRC layer that the RA procedure based on the second data packet is performed. The MAC layer and/or RLC layer may indicate the RRC layer that the fallback procedure is performed so that the RRC layer performs the legacy procedure.

If the UE completes the RA procedure based on the second data packet, the processor 1510 may be configured to discard the second data packet. The processor 1510 may be configured to indicate the RRC layer that the RA procedure based on the second data packet is completed so that the RRC layer performs retransmission.

Alternatively, if the UE succeeds the RA Procedure based on the first data packet, the processor 1510 may be configured to discard the first data packet and the second data packet. The processor 1510 may be configured to discard the second data packet even if the UE does not transmit the second data packet to the network at all. The processor 1510 may be configured to flush the buffer that contains the first data packet and the second data packet.

The power management module 1511 manages power for the processor 1510 and/or the transceiver 1530. The battery 1512 supplies power to the power management module 1511. The display 1513 outputs results processed by the processor 1510. The keypad 1514 receives inputs to be used by the processor 1510. The keypad 1514 may be shown on the display 1513. The SIM card 1515 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1520 is operatively coupled with the processor 1510 and stores a variety of information to operate the processor 1510. The memory 1520 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1520 and executed by the processor 1510. The memory 1520 can be implemented within the processor 1510 or external to the processor 1510 in which case those can be communicatively coupled to the processor 1510 via various means as is known in the art.

The transceiver 1530 is operatively coupled with the processor 1510, and transmits and/or receives a radio signal. The transceiver 1530 includes a transmitter and a receiver. The transceiver 1530 may include baseband circuitry to process radio frequency signals. The transceiver 1530 controls the one or more antennas 1531 to transmit and/or receive a radio signal.

The speaker 1540 outputs sound-related results processed by the processor 1510. The microphone 1541 receives sound-related inputs to be used by the processor 1510.

According to the embodiment of the present invention shown in FIG. 15, when two versions of RRC messages are submitted to the lower layers and when the EDT procedure fails, the UE can discard the RRC message for the EDT procedure and can continue the RA procedure by using the RRC message for the legacy procedure. Therefore, processing time of the RA procedure can be reduced.

The present invention may be applied to various future technologies, such as AI, and/or robots.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

Figure 16:
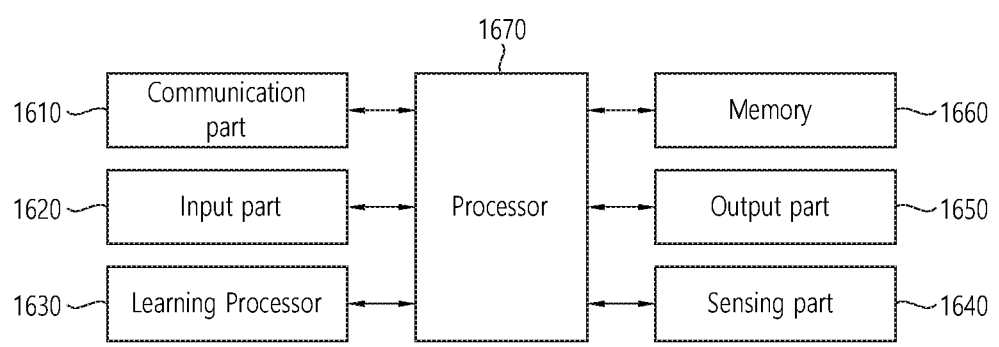
FIG. 16 shows an example of an AI device to which the technical features of the present invention can be applied.

FIG. 16 shows an example of an AI device to which the technical features of the present invention can be applied.

The AI device 1600 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 16, the AI device 1600 may include a communication part 1610, an input part 1620, a learning processor 1630, a sensing part 1640, an output part 1650, a memory 1660, and a processor 1670.

The communication part 1610 can transmit and/or receive data to and/or from external devices such as the AI devices and the AI server using wire and/or wireless communication technology. For example, the communication part 1610 can transmit and/or receive sensor information, a user input, a learning model, and a control signal with external devices. The communication technology used by the communication part 1610 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1620 can acquire various kinds of data. The input part 1620 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1620 can acquire input data to be used when acquiring an output using learning data and a learning model for model learning. The input part 1620 may obtain raw input data, in which case the processor 1670 or the learning processor 1630 may extract input features by preprocessing the input data.

The learning processor 1630 may learn a model composed of an ANN using learning data. The learned ANN can be referred to as a learning model. The learning model can be used to infer result values for new input data rather than learning data, and the inferred values can be used as a basis for determining which actions to perform. The learning processor 1630 may perform AI processing together with the learning processor of the AI server. The learning processor 1630 may include a memory integrated and/or implemented in the AI device 1600. Alternatively, the learning processor 1630 may be implemented using the memory 1660, an external memory directly coupled to the AI device 1600, and/or a memory maintained in an external device.

The sensing part 1640 may acquire at least one of internal information of the AI device 1600, environment information of the AI device 1600, and/or the user information using various sensors. The sensors included in the sensing part 1640 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1650 may generate an output related to visual, auditory, tactile, etc. The output part 1650 may include a display unit for outputting visual information, a speaker for outputting auditory information, and/or a haptic module for outputting tactile information.

The memory 1660 may store data that supports various functions of the AI device 1600. For example, the memory 1660 may store input data acquired by the input part 1620, learning data, a learning model, a learning history, etc.

The processor 1670 may determine at least one executable operation of the AI device 1600 based on information determined and/or generated using a data analysis algorithm and/or a machine learning algorithm. The processor 1670 may then control the components of the AI device 1600 to perform the determined operation. The processor 1670 may request, retrieve, receive, and/or utilize data in the learning processor 1630 and/or the memory 1660, and may control the components of the AI device 1600 to execute the predicted operation and/or the operation determined to be desirable among the at least one executable operation. The processor 1670 may generate a control signal for controlling the external device, and may transmit the generated control signal to the external device, when the external device needs to be linked to perform the determined operation. The processor 1670 may obtain the intention information for the user input and determine the user's requirements based on the obtained intention information. The processor 1670 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1630 and/or learned by the learning processor of the AI server, and/or learned by their distributed processing. The processor 1670 may collect history information including the operation contents of the AI device 1600 and/or the user's feedback on the operation, etc. The processor 1670 may store the collected history information in the memory 1660 and/or the learning processor 1630, and/or transmit to an external device such as the AI server. The collected history information can be used to update the learning model. The processor 1670 may control at least some of the components of AI device 1600 to drive an application program stored in memory 1660. Furthermore, the processor 1670 may operate two or more of the components included in the AI device 1600 in combination with each other for driving the application program.

Figure 17:
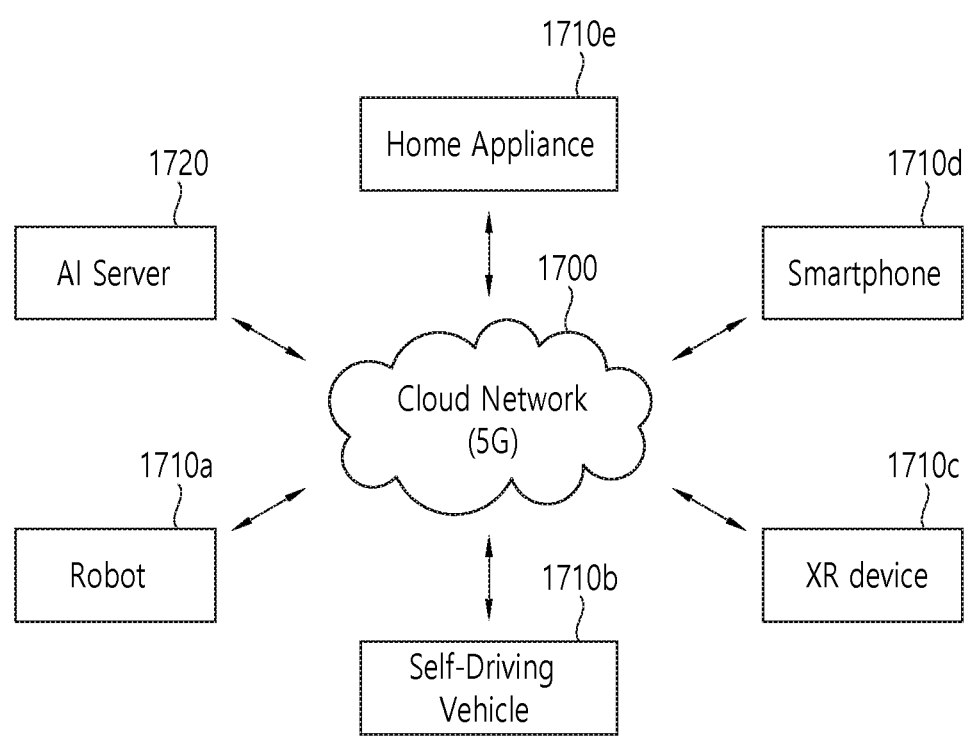
FIG. 17 shows an example of an AI system to which the technical features of the present invention can be applied.

FIG. 17 shows an example of an AI system to which the technical features of the present invention can be applied.

Referring to FIG. 17, in the AI system, at least one of an AI server 1720, a robot 1710a, an autonomous vehicle 1710b, an XR device 1710c, a smartphone 1710d and/or a home appliance 1710e is connected to a cloud network 1700. The robot 1710a, the autonomous vehicle 1710b, the XR device 1710c, the smartphone 1710d, and/or the home appliance 1710e to which the AI technology is applied may be referred to as AI devices 1710a to 1710e.

The cloud network 1700 may refer to a network that forms part of a cloud computing infrastructure and/or resides in a cloud computing infrastructure. The cloud network 1700 may be configured using a 3G network, a 4G or LTE network, and/or a 5G network. That is, each of the devices 1710a to 1710e and 1720 consisting the AI system may be connected to each other through the cloud network 1700. In particular, each of the devices 1710a to 1710e and 1720 may communicate with each other through a base station, but may directly communicate with each other without using a base station.

The AI server 1700 may include a server for performing AI processing and a server for performing operations on big data. The AI server 1700 is connected to at least one or more of AI devices constituting the AI system, i.e. the robot 1710a, the autonomous vehicle 1710b, the XR device 1710c, the smartphone 1710d and/or the home appliance 1710e through the cloud network 1700, and may assist at least some AI processing of the connected AI devices 1710a to 1710e. The AI server 1700 can learn the ANN according to the machine learning algorithm on behalf of the AI devices 1710a to 1710e, and can directly store the learning models and/or transmit them to the AI devices 1710a to 1710e. The AI server 1700 may receive the input data from the AI devices 1710a to 1710e, infer the result value with respect to the received input data using the learning model, generate a response and/or a control command based on the inferred result value, and transmit the generated data to the AI devices 1710a to 1710e. Alternatively, the AI devices 1710a to 1710e may directly infer a result value for the input data using a learning model, and generate a response and/or a control command based on the inferred result value.

Various embodiments of the AI devices 1710a to 1710e to which the technical features of the present invention can be applied will be described. The AI devices 1710a to 1710e shown in FIG. 17 can be seen as specific embodiments of the AI device 1600 shown in FIG. 16.

<AI+Robot>

The robot 1710a may be implemented as a guide robot, a carrying robot, a cleaning robot, a wearable robot, an entertainment robot, a pet robot, an unmanned flying robot, etc., to which AI technology is applied. The robot 1710a may include a robot control module for controlling the operation, and the robot control module may refer to a software module and/or a chip implementing the software module. The robot 1710a may acquire the state information of the robot 1710a using the sensor information acquired from various kinds of sensors and/or detect (recognize) the surrounding environment and/or the object, and/or generate map data, and/or determine a travel route and/or a travel plan, and/or determine a response to user interaction, and/or determine an operation. The robot 1710a can use the sensor information acquired from at least one sensor among the LIDAR, the radar, and/or the camera to determine the travel route and/or the travel plan.

The robot 1710a can perform the above-described operations using a learning model composed of at least one ANN. For example, the robot 1710a can recognize the surrounding environment and/or the object using the learning model, and can determine the operation using the recognized surrounding information and/or the object information. The learning model may be learned directly from the robot 1710a and/or learned from an external device such as the AI server 1700. The robot 1710a can directly generate a result using the learning model and perform an operation. The robot 1710a may transmit sensor information to an external device such as the AI server 1700 and may receive the generated result and perform an operation.

The robot 1710a may determine the travel route and/or the travel plan using at least one of the map data, the object information detected from the sensor information and/or the object information acquired from the external device, and drive the robot 1710a according to the determined travel route and/or travel plan by controlling the driving unit. The map data may include object identification information on various objects arranged in a space in which the robot 1710a moves. For example, the map data may include object identification information on fixed objects such as walls and doors, and/or on movable objects such as pots and desks. The object identification information may include a name, a type, a distance, and/or a position, etc. The robot 1710a can perform the operation and/or run by controlling the driving unit based on the control/interaction of the user. The robot 1710a may acquire the intention information of the interaction due to the user's operation and/or voice utterance, determine the response based on the acquired intention information, and perform the operation.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:

initiating Random Access (RA) procedure for an Early Data Transmission (EDT);

generating, by a Radio Resource Control (RRC) layer of the wireless device, a first data packet and a second data packet upon initiating the RA procedure for the EDT, wherein the first data packet is for an RRC Early Data Request message for the EDT and the second data packet is for an RRC Connection Request message for a fallback procedure of the EDT;

storing, by a Radio Link Control (RLC) layer of the wireless device, the first data packet in a first buffer and the second data packet in a second buffer different from the first buffer, wherein logical channel priority (LCP) of the first data packet stored in the first buffer is higher than LCP of the second data packet stored in the second buffer; and performing the initiated RA procedure based on the first data packet and the second data packet, wherein the RA procedure comprises:

transmitting, to a network, a preamble informing the EDT procedure is initiated;

receiving, from the network, a RA response message including an uplink (UL) grant for the RA procedure;

determining that the UL grant provided in the RA Response message is not for the EDT;

discarding the first data packet from the first buffer based on the determination;

transmitting, to the network, the second data packet, which is stored in the second buffer, via the uplink grant included in the RA response message without triggering another RA procedure; and indicating the RRC layer that (i) the EDT procedure for the first data packet is failed, and (ii) the RA procedure based on the second data packet is performed.

2. The method of claim 1, wherein it is determined that the UL grant provided in the RA Response message is not for the EDT, based on a size of an uplink (UL) grant received in the RA procedure being smaller than a size of the first data packet, or based on a size of a UL grant received in the RA procedure being smaller than an allowed transport block size (TBS) for a current coverage enhancement (CE) level.

3. The method of claim 1, wherein the RA procedure further comprises, discarding the first data packet from the first buffer even though the first data packet is not successfully transmitted to the network.

4. The method of claim 1, wherein the wireless device is in communication with at least one of a user equipment, a network, and/or autonomous vehicles other than the wireless device.

5. A wireless device configured to operate in a wireless communication system, the wireless device comprising:

a transceiver;

a processor; and a computer-readable storage medium coupled to the processor and storing instructions that, based on being executed by the processor, control the wireless device to perform operations comprising:

initiating a Random Access (RA) procedure for an Early Data Transmission (EDT);

generating, by a Radio Resource Control (RRC) layer of the wireless device, a first data packet and a second data packet upon initiating the RA procedure for the EDT, wherein the first data packet is for an RRC Early Data Request message for the EDT and the second data packet is for an RRC Connection Request message for a fallback procedure of the EDT;

storing, by a Radio Link Control (RLC) layer of the wireless device, the first data packet in a first buffer and the second data packet in a second buffer different from the first buffer, wherein logical channel priority (LCP) of the first data packet stored in the first buffer is higher than LCP of the second data packet stored in the second buffer; and performing the initiated RA procedure based on the first data packet and the second data packet, wherein the RA procedure comprises:

transmitting, via the transceiver to a network, a preamble informing the EDT procedure is initiated;

receiving, via the transceiver from the network, a RA response message including an uplink (UL) grant for the RA procedure;

determining that that the UL grant provided in the RA Response message is not for the EDT;

discarding the first data packet from the first buffer based on the determination;

transmitting, to the network, the second data packet, which is stored in the second buffer, via the uplink grant included in the RA response message without triggering another RA procedure; and indicating the RRC layer that (i) the EDT procedure for the first data packet is failed, and (ii) the RA procedure based on the second data packet is performed.

6. The wireless device of claim 5, wherein it is determined that the UL grant provided in the RA Response message is not for the EDT, based on a size of an uplink (UL) grant received in the RA procedure being smaller than a size of the first data packet, or based on a size of a UL grant received in the RA procedure being smaller than an allowed transport block size (TBS) for a current coverage enhancement (CE) level.

7. The wireless device of claim 5, wherein, in the RA procedure, the operations further comprise:

discarding the first data packet from the first buffer even though the first data packet is not successfully transmitted to the network.

8. A processing apparatus for a wireless device in a wireless communication system, wherein the processing apparatus is configured to control the wireless device to:

initiate a Random Access (RA) procedure for an Early Data Transmission (EDT);

generate, by a Radio Resource Control (RRC) layer of the wireless device, a first data packet and a second data packet upon initiating the RA procedure for the EDT, wherein the first data packet is for an RRC Early Data Request message for the EDT and the second data packet is for an RRC Connection Request message for a fallback procedure of the EDT;

store, by a Radio Link Control (RLC) layer of the wireless device, the first data packet in a first buffer and the second data packet in a second buffer different from the first buffer, wherein logical channel priority (LCP) of the first data packet stored in the first buffer is higher than LCP of the second data packet stored in the second buffer; and perform the initiated RA procedure based on the first data packet and the second data Packet, wherein, in the RA procedure, the processing apparatus is configured to control the wireless device to:

transmit, to a network, a preamble informing the EDT procedure is initiated;

receive, from the network, a RA response message including an uplink (UL) grant for the RA procedure;

determine that the UL grant provided in the RA Response message is not for the EDT;

discard the first data packet from the first buffer based on the determination;

transmit, to the network, the second data packet, which is stored in the second buffer, via the uplink grant included in the RA response message without triggering another RA procedure; and indicate the RRC layer that (i) the EDT procedure for the first data packet is failed, and (ii) the RA procedure based on the second data packet is performed.

* * * * *